(12) United States Patent
Okada et al.

(10) Patent No.: US 6,785,097 B2
(45) Date of Patent: Aug. 31, 2004

(54) THIN FILM MAGNETIC RECORDING HEAD, METHOD OF FABRICATING THE THIN FILM MAGNETIC RECORDING HEAD AND MAGNETIC DISK DRIVE

(75) Inventors: Tomohiro Okada, Enschede (NL); Yoshiaki Kawato, Tokyo (JP); Kaori Suzuki, Mitaka (JP); Hiroshi Fukui, Hitachi (JP); Isao Nunokawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 202 days.

(21) Appl. No.: 10/068,986

(22) Filed: Feb. 11, 2002

(65) Prior Publication Data
US 2003/0026039 A1 Feb. 6, 2003

(30) Foreign Application Priority Data
Aug. 3, 2001 (JP) ........................................ 2001-235835

(51) Int. Cl.$^7$ .............................. G11B 5/11; G11B 5/147
(52) U.S. Cl. ........................................ 360/317; 360/126
(58) Field of Search ................................. 360/125, 126, 360/317

(56) References Cited

U.S. PATENT DOCUMENTS

| 4,546,398 A | * | 10/1985 | Toda et al. ................. 360/126 |
| 5,073,836 A | * | 12/1991 | Gill et al. .................... 360/317 |
| 6,618,227 B2 | * | 9/2003 | Yano et al. ................. 360/317 |
| 6,636,390 B2 | * | 10/2003 | Funayama et al. .......... 360/317 |
| 6,657,813 B2 | * | 12/2003 | Nishida et al. ............. 360/125 |

* cited by examiner

Primary Examiner—Robert S. Tupper
(74) Attorney, Agent, or Firm—Antonelli, Terry, Stout & Kraus, LLP (57) ABSTRACT

The invention fabricates a perpendicular recording head eliminating influence of external magnetic field and provides a magnetic disk drive having high stability by using the magnetic recording head and constructs a structure in which shield against external magnetic field is formed from a main pole via a gap layer and an edge portion thereof is recessed from a surface against a medium. By providing the shield against the external magnetic field, the influence of the external magnetic field is restrained and by recessing the edge from the surface against the medium, leakage of magnetic field from the shield against the external magnetic field to the medium is prevented to thereby prevent a magnetization signal from being erased.

7 Claims, 7 Drawing Sheets

THIN FILM MAGNETIC RECORDING HEAD, METHOD OF FABRICATING THE THIN FILM MAGNETIC RECORDING HEAD AND MAGNETIC DISK DRIVE

BACKGROUND OF THE INVENTION

The present invention relates to a thin film magnetic recording head used for recording and reproducing in a magnetic disk drive or the like and a magnetic disk drive mounted therewith.

In a magnetic disk drive, data on a recording medium is read and written by a thin film magnetic head. In order to increase a recording capacity per unit area of a magnetic disk, it is necessary to form an area recording density in a high density. However, according to a current longitudinal recording system, when a length of a bit to be recorded is reduced, there poses a problem that the plane recording density cannot be increased owing to thermal fluctuation of magnetization of a medium.

In order to solve the problem, there is provided a perpendicular recording system for recording a magnetization signal in a direction perpendicular to a medium. Also in the perpendicular recording system, in reproduction, there can be used a magnetoresistance effect type head (MR head) and a giant magnetoresistance effect type head (GMR head) having a large reproduced output. Meanwhile, in recording, it is necessary to use a single pole type magnetic head. Also in perpendicular recording, it is necessary to increase a tracking density and a line recording density in order to increase the recording density. In either of them, in order to increase the tracking density, it is necessary to form a track width of the magnetic head very finely and highly accurately.

Further, in perpendicular recording, there poses a problem that noise is generated by an external magnetic field or the like. For example, there is a description with regard to a spike noise from an external magnetic field in 'Japanese Patent Application Laid-Open No. H07-225901'. After the noise is detected, the noise is canceled. Further, the problem of noise after recording is also considered to be derived from that a magnetic domain of a main pole is unstable and the magnetic domain is moved. There is a description with regard to a single pole type head having a shield for resistance against external magnetic field in 'Digest of 24th Conference of Japan Society of Applied Magnetics (P161)'.

According to a proposal of 'Japanese Patent Application Laid-Open No. H07-225901, there is disclosed means for detecting a spike noise and avoiding error and there is no description with regard to a reduction in the noise at the magnetic head. Further, there poses a problem that a main pole is magnetized by an external magnetic field, a magnetic field thereof is leaked to a medium and the magnetization signal on the medium is erased.

As a countermeasure thereagainst, in 'Digest of 24th Conference of Japan Society of Applied Magnetics (P161)', there is disclosed a structure of providing a shield against the external magnetic field in the single pole head. According to the structure, the shield against the external magnetic field is constructed by a structure of being exposed to a surface against the media. Therefore, although there is achieved a significant effect for preventing the external magnetic field from entering the main pole, there also poses a problem that the shield against the external magnetic field collects the external magnetic field, the external magnetic field leaks from the surface against the media to the media, the magnetization signal of the media is erased or a signal is written. Further, there also poses a problem that a magnetic field in recording is leaked from the main pole and leaked to the media via the shield against the external magnetic field.

SUMMARY OF THE INVENTION

Hence, it is an object of the invention to provide a thin film magnetic recording head having a perpendicular recording head in which noise by external field is eliminated and a shield for preventing the noise does not leak magnetic field to a medium and a method of fabricating the same as well as a magnetic disk drive having high stability mounted with the perpendicular recording head.

In order to achieve the above-described object, according to an aspect of the invention, there is provided a thin film magnetic recording head comprising a single pole type perpendicular recording head including an auxiliary pole, a main pole and a shield against an external magnetic field, wherein an edge of the shield against the external magnetic field is provided at a position recessed at least from an edge of the main pole relative to a surface against a medium.

Further, according another aspect of the invention, there is provided a thin film magnetic recording head including a reproducing head using a magnetoresistance effect and a single pole type perpendicular recording head, wherein the perpendicular recording head includes an auxiliary pole, a main pole, a shield against an external magnetic field, a first gap layer formed between the auxiliary pole and the main pole and a second gap layer formed between the main pole and the shield against the external magnetic field, and wherein a width of the auxiliary pole opposed to the first gap layer is larger than a width of the main pole opposed to the first gap layer and an edge of the shield against the external magnetic field is provided at a position recessed at least from an edge of the main pole relative to a surface against a medium.

Further, according to another aspect of the invention, in the above-described constitution, an amount of recession from the surface against the medium of an edge of the shield against the external magnetic field falls in a range of 0.5 through 3 $\mu$m at a portion thereof opposed to the main pole, further, an interval of a gap formed between the main pole and the shield against the external magnetic field falls in a range of 0.5 through 3 $\mu$m, further, a position of the edge of the shield against the external magnetic field in a direction remote from the surface against the medium, is disposed to be remote from a position of the edge of the main pole in the direction remote from the surface against the medium by 1 through 10 $\mu$m.

Further, according to another aspect of the invention, there is provided a method of fabricating a thin film magnetic recording head including a perpendicular recording head having an auxiliary pole, a main pole and a shield against an external magnetic field, the method including a step in which the shield against the external magnetic field is formed by using an electroplating method with photoresist frame and formed such that an edge of the shield against the external magnetic field is disposed at a position recessed at least from an edge of the main pole relative to a surface against a medium.

Furthermore, according to another aspect of the invention, there is provided a magnetic disk drive constituted to execute recording and reproducing by a thin film magnetic recording head, wherein the thin film magnetic recording head includes a single pole type perpendicular recording head which includes an auxiliary pole, a main pole and a shield against an external magnetic field and in which an edge of the shield against the external magnetic field is provided at a position recessed at least from an edge of the main pole relative to a surface against a medium.

DETAILED DESCRIPTION OF THE PREFERRED EMBODIMENTS

An explanation will be given of embodiments of the invention in reference to the drawings as follows.

Figure 1:
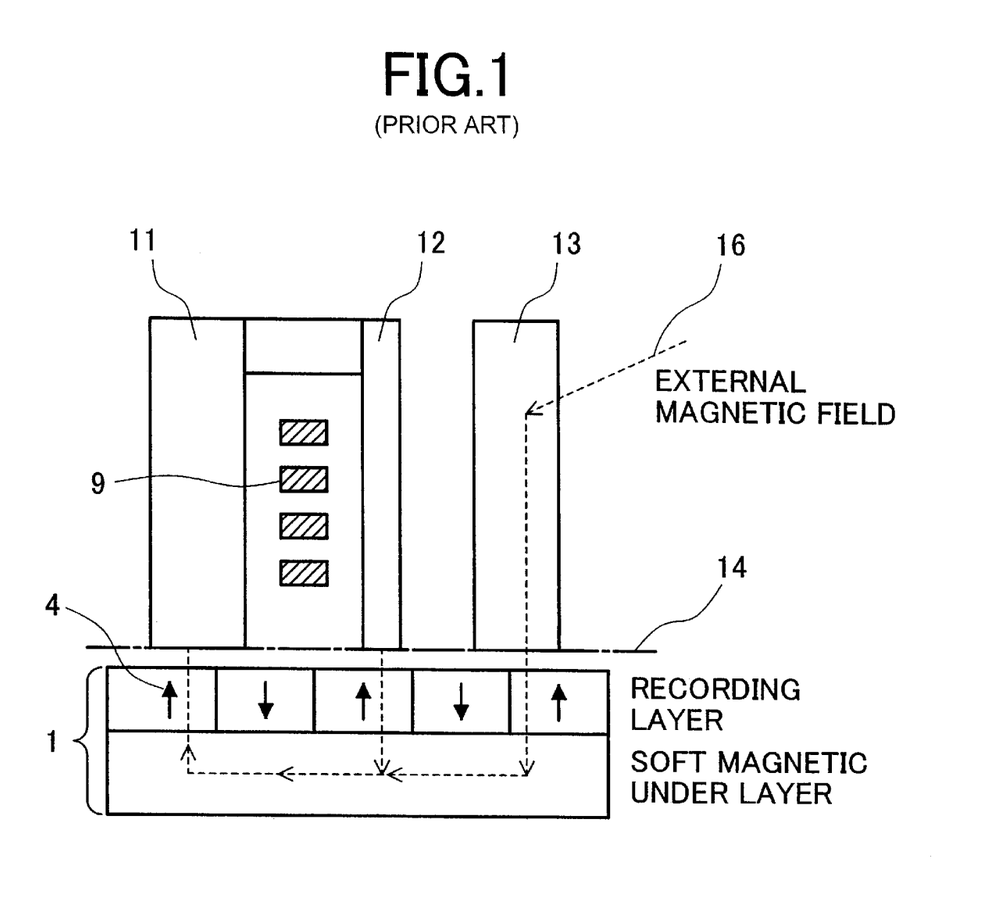
FIG. 1 is an outline view showing a conventional perpendicular recording magnetic recording head having a shield against the external magnetic field.

First, FIG. 1 shows an outline view in the case of a conventional structure of a magnetic head. According to the conventional structure, a shield 13 is exposed up to a plane of surface 14 representing an air bearing surface of the magnetic head with respect to a surface of the media 1 and therefore, a magnetic field is leaked from an edge thereof. Therefore, there poses a problem of erasing a magnetization signal 4 on the media (magnetic disk) 1. As shown, an edge of the main pole 12 which faces the media and an edge of the shield 13 which faces the media are arranged in the same plane of the air bearing surface 14 of the magnetic head. In this way, according to a single pole type recording head used in the perpendicular recording method, there poses a problem that noise is generated by an external magnetic field 16 or the like, or a main pole 12 is magnetized by the external magnetic field 16 and its magnetic field is leaked to the medium 1 and erases the signal. As a method of resolving the problem, a shield against the external magnetic field may be provided, however, according to the conventional technology, there poses a problem that the shield 13 against the external magnetic field collects the external magnetic field 16 and the magnetization signal 4 of the media is erased or a problem that a recording magnetic field enters the shield and is leaked to the medium.

Hence, in order to solve these problems, it has been found that there may be constructed a structure for preventing the shield against the external magnetic field from being exposed to an air bearing surface.

Figure 2:
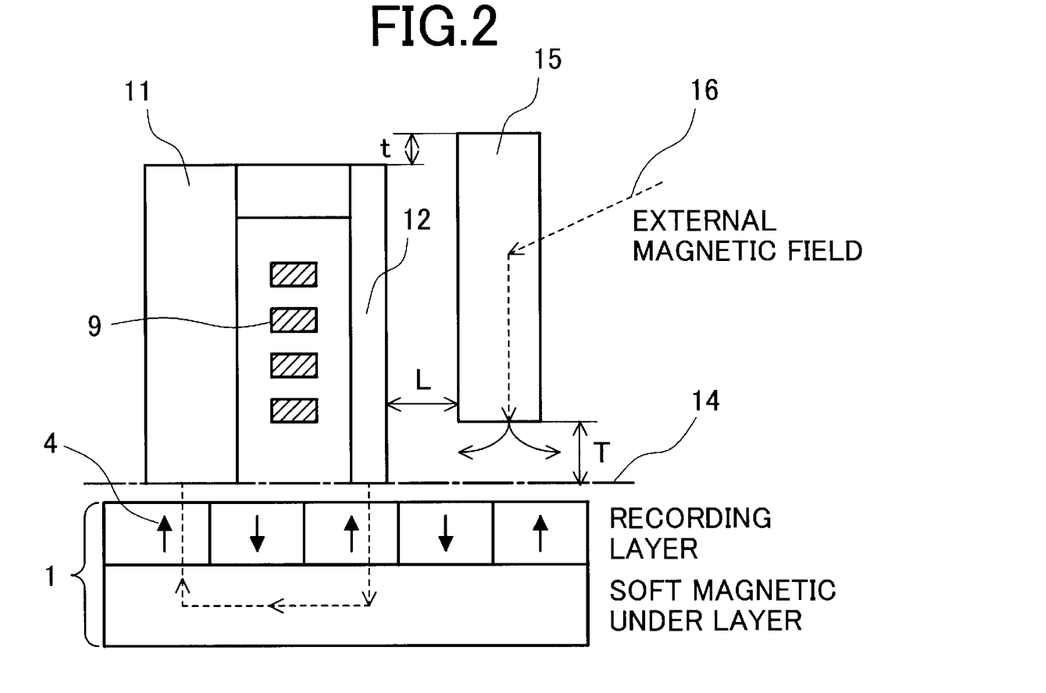
FIG. 2 is a conceptual view showing a basic constitution of a thin film magnetic recording head according to the invention.

FIG. 2 is a conceptual view showing a basic constitution of a thin film magnetic recording head according to the invention.

In the case of the invention, an edge of a shield 15 against the external magnetic field is recessed or spaced from a plane of the air bearing surface 14 of the magnetic head with respect to the surface of the media 1 and therefore, the magnetic field is not leaked to the media 1. In that case, it has been found that it is important for an effect of shielding in the external magnetic field and a reduction in the magnetic field leaked to the medium to optimize a gap interval (L) between the main pole 12 and the shield 15 against the external magnetic field and an amount (T) of recession or spacing of an edge of the shield 15 against the external magnetic field from the plane of the air bearing surface 14 with respect to a surface of the media. As shown, an edge of the main pole 12 which faces the media 1 is arranged at the plane of the air bearing surface 14 and the edge of the shield 15 which faces the media 1 is spaced from the plane of the air bearing surface 14.

It has been found that it is preferable that the gap interval (L) between the main pole 12 and the shield 15 against the external magnetic field, falls in a range of 0.5 through 3 $\mu$m and it is preferable that the amount (T) of recession or spacing of the shield 15 against the external magnetic field from the plane of the air bearing surface 14 with respect to the media, falls in a range of 0.5 through 3 $\mu$m.

Further, it is preferable that a size of the shield 15 against the external magnetic field is larger than that of the main pole 12, particularly with regard to a position of an edge thereof in a direction remote from the plane of the air bearing surface 14 with respect to the media, it is preferable that the position of the edge of the shield 15 is higher than a position of an edge of the main pole 12 remote from the plane of the surface 14 with respect to the media by 1 through 10 $\mu$m (=t). Because when the position is excessively high, there is brought about an effect of collecting the external magnetic field.

As a material of the shield 15 against the external magnetic field, there can be used, for example, a soft magnetic material such as NiFe, FeNi, CoNiFe or the like. As a method of fabricating the shield 15 against the external magnetic field, as mentioned later, for example, an electroplating method with photoresist frame is applicable. Naturally, after depositing a magnetic layer by a sputtering method, a pattern may be formed by etching. The accuracy is promoted in the case of the electroplating method with photoresist frame since the shield 15 against the external magnetic field can be formed by using a conventional magnetic core forming technology.

Figure 3:
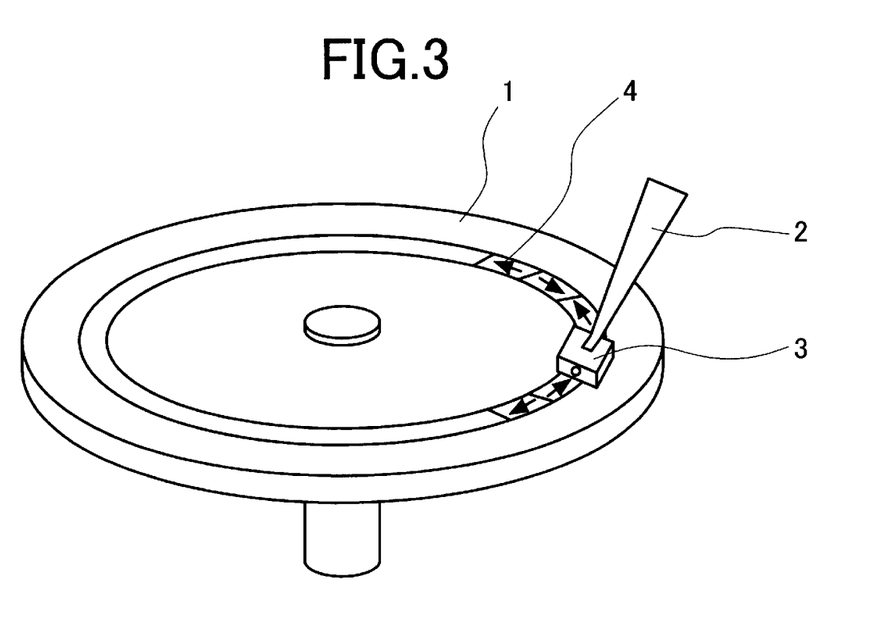
FIG. 3 is an outline view showing a conception of a magnetic disk drive in the case of mounting the thin film magnetic recording head according to the invention.

FIG. 3 is an outline view showing a conception of a magnetic disk drive in the case of mounting a thin film magnetic recording head according to the invention (however, magnification of the drawing is not uniform). The magnetic disk drive records and reproduces the magnetization signal 4 onto and from the magnetic disk 1 by a magnetic head 3 fixed to a front end of a supporting member 2.

Figure 4:
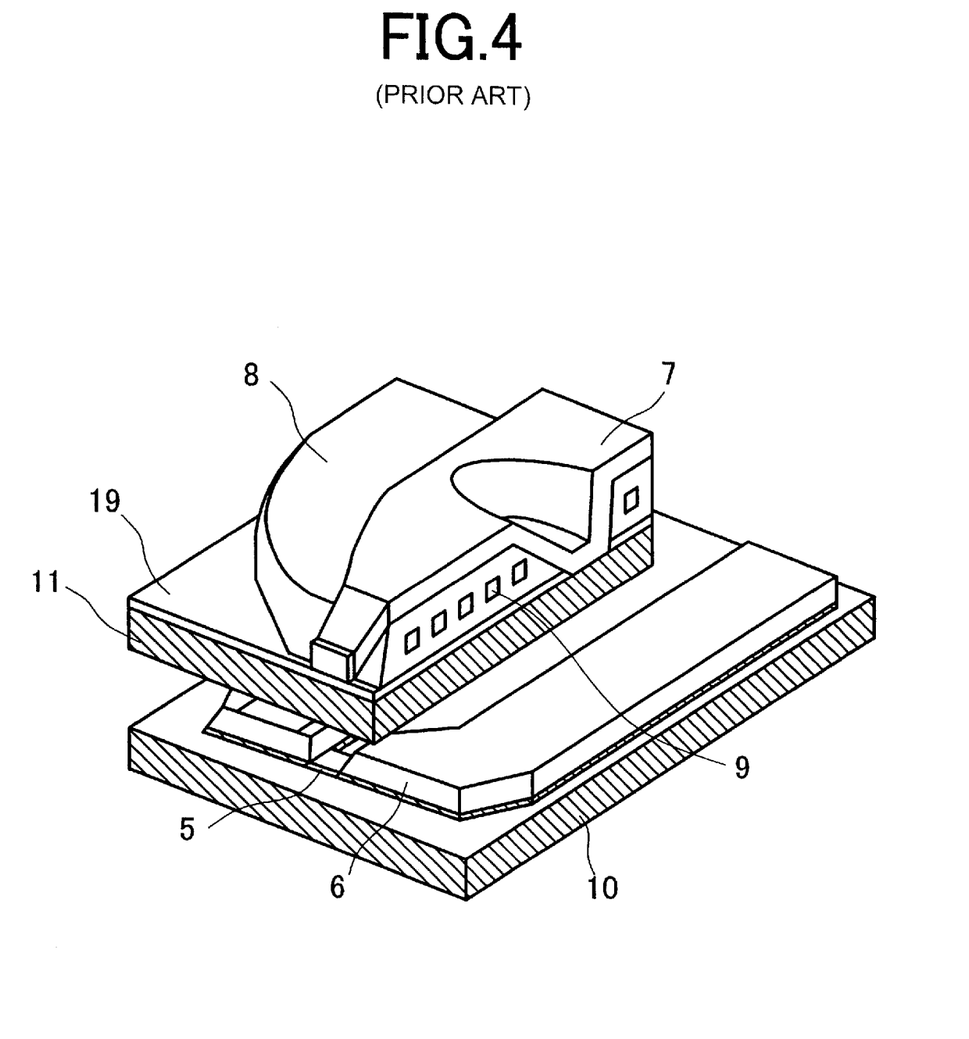
FIG. 4 is an outline view showing a conventional longitudinal recording magnetic recording head.

FIG. 4 shows an outline view of a conventional recording/reproducing separated type thin film recording head for longitudinal recording (however, magnification of the drawing is not uniform). There is constructed a structure in which a recording head is laminated on a reproducing head utilizing a magnetoresistance effect films 5.

Figure 5:
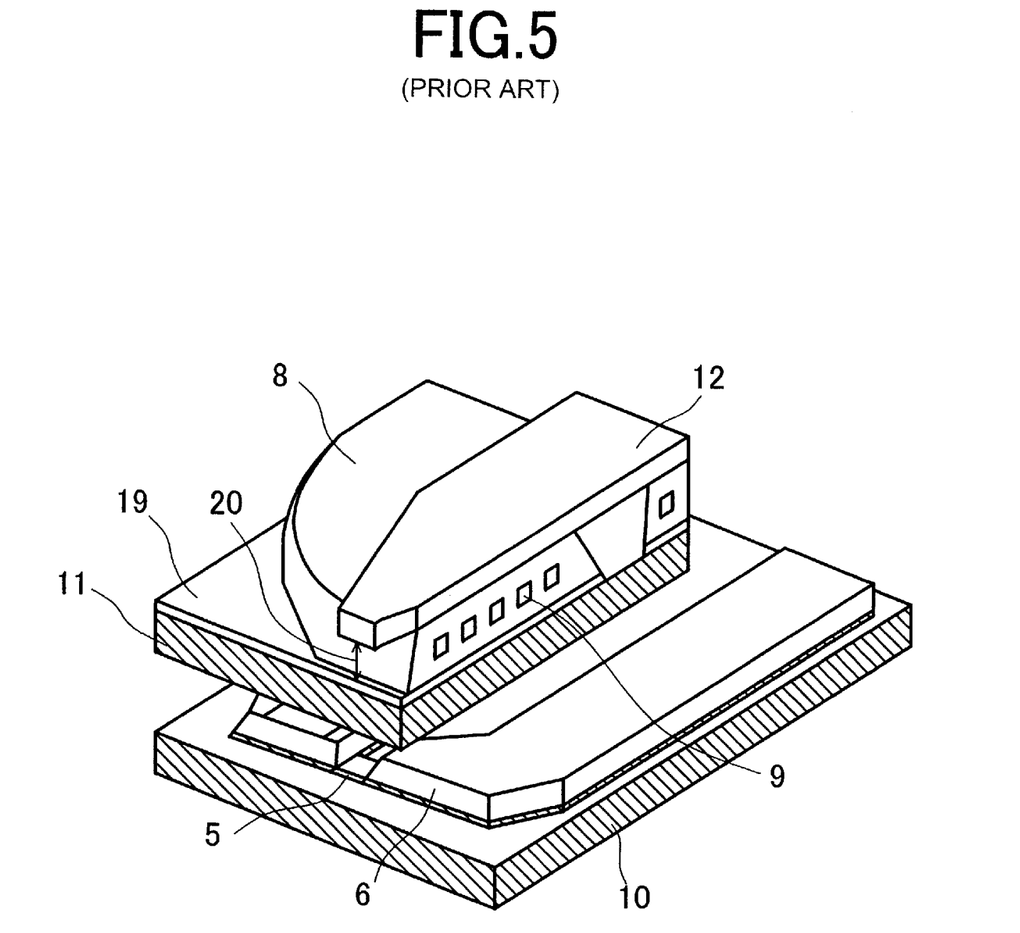
FIG. 5 is an outline view showing a conventional perpendicular recording magnetic recording head.

FIG. 5 shows an outline view of a conventional recording/reproducing separated type thin film magnetic recording head for perpendicular recording (however, magnification of the drawing is not uniform). There is constructed a structure in which a single pole type perpendicular recording head is laminated on a reproducing head by utilizing the magnetoresistance effect film 5. A significant difference from the above-described magnetic recording head for longitudinal recording, resides in that whereas there is provided a thin (for example, 0.2 μm) gap layer 19 in the surface against the media between an upper magnetic core 7 of the conventional head and an upper shield 11 of the reproducing head serving also as a lower magnetic core, according to the magnetic recording head for perpendicular recording, a gap interval 20 between a main pole 12 and the upper shield (auxiliary pole) 11, is significantly opened (for example, 5 through 10 μm).

Figure 6:
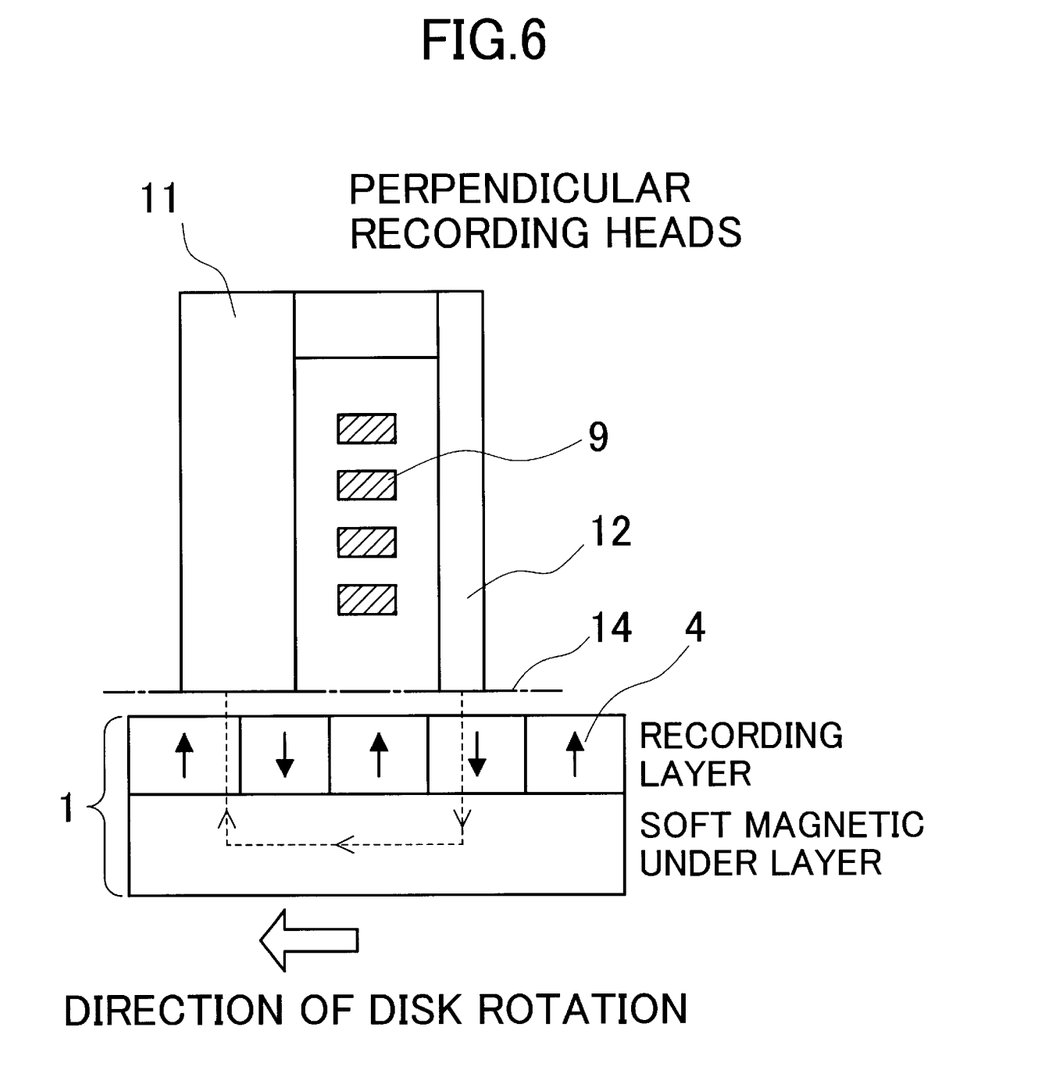
FIG. 6 is an outline view showing the principle of a perpendicular recording method.

FIG. 6 shows an outline view of the principle of a perpendicular recording method (however, magnification of the drawing is not uniform). A magnetic field coming out from the main pole 12 forms a magnetic circuit passing through a recording layer and a soft magnetic underlayer and entering the upper shield 11 constituting the auxiliary pole and records the magnetization pattern 4 to the recording layer.

Figure 7:
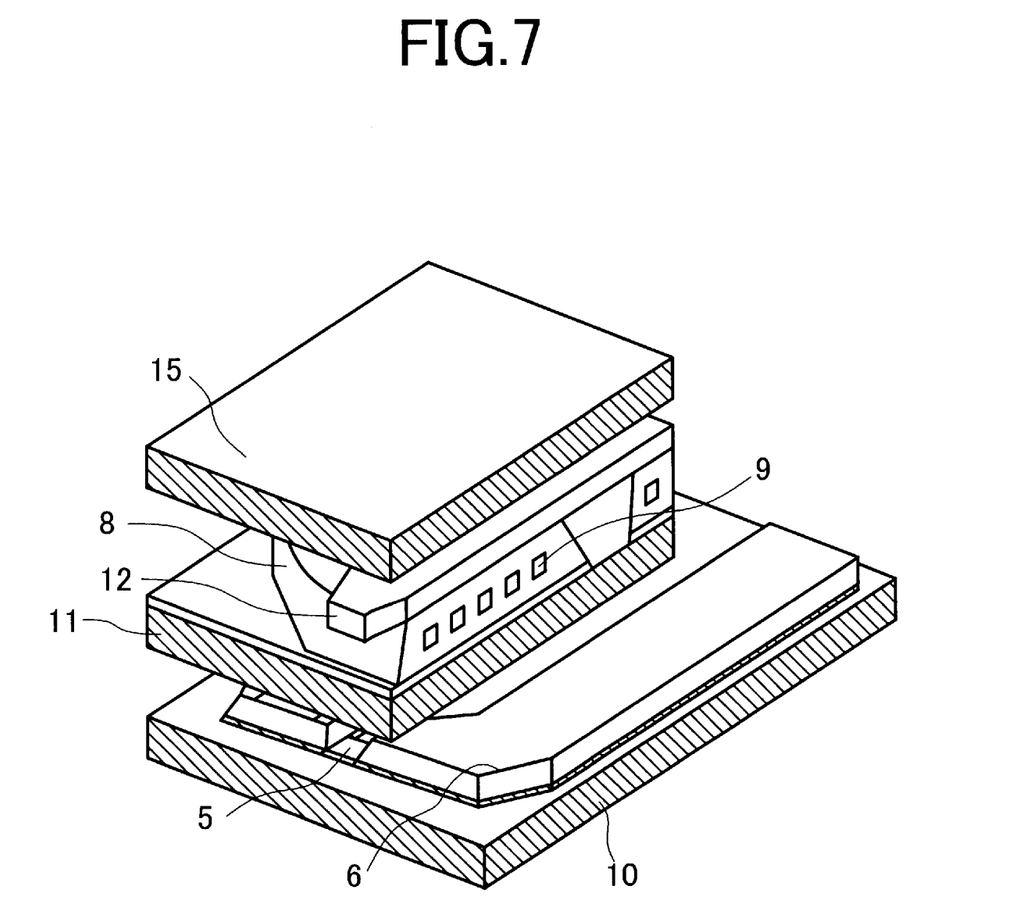
FIG. 7 is an outline view showing a perpendicular recording head having a shield against the external magnetic field according to an embodiment of the invention.

FIG. 7 shows an outline view showing a perpendicular recording head provided with a shield against the external magnetic field according to an embodiment of the invention (however, magnification of the drawing is not uniform). The basic constitution of the perpendicular recording head according to the invention, is as shown by FIG. 2 and the shield 15 against the external magnetic field recessed from the face against the media, is arranged on the main pole 12 via the gap layer (not illustrated in the drawing).

FIGS. 8A through 8E show sectional views of a method of fabricating the perpendicular recording magnetic recording head according to the invention (however, magnification of the drawing is not uniform and the reproducing head is omitted).

Figure 8A:
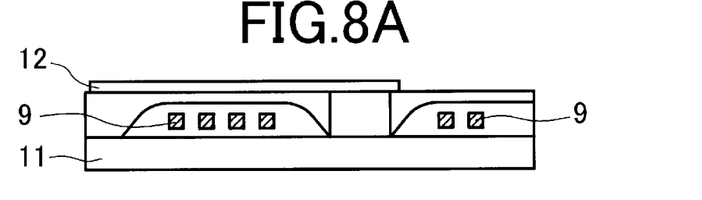
FIGS. 8A through 8E are outline views of a method of fabricating the perpendicular recording head according to the invention.

FIG. 8A shows that there have been formed the upper shield 11 constituting the auxiliary pole, coils 9 and the main pole 12. As a material of the main pole 12, CoNiFe is used.

Figure 8B:
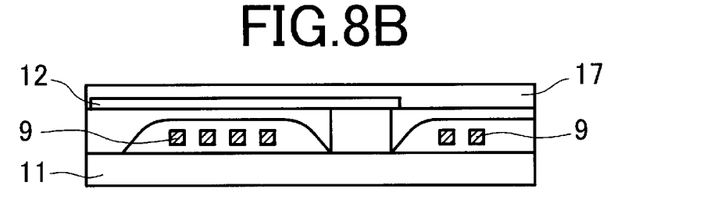

FIG. 8B shows that a gap layer 17 has been formed on the main pole 12. As a material of the gap layer, alumina is used and the gap layer is formed by the sputtering method. A film thickness thereof is made 1 μm.

Figure 8C:
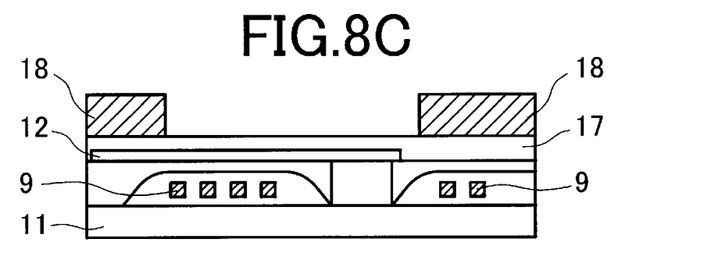

FIG. 8C shows that a resist frame 18 has been formed after forming a seed layer for plating (not illustrated in the drawing) on the gap layer 17. A positive photoresist or a negative photoresist on sale can sufficiently be used for the photoresist frame.

Figure 8D:
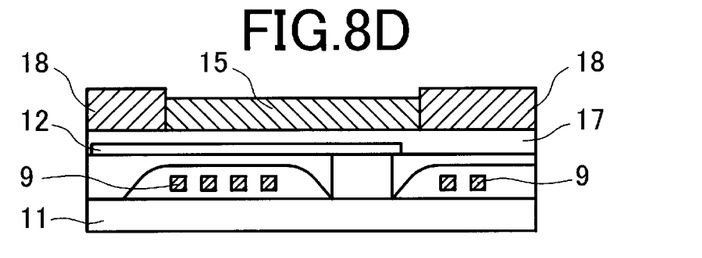

FIG. 8D shows that a shield against the external magnetic field has been plated. As a material therefor, NiFe is used and a film thickness thereof is made 3 μm. A amount (T) of recession from the surface against the media is made 1 μm. A position of an edge of the shield in the direction remote from the surface against media is made a position remote from a position of an edge of the main pole by 5 μm. Naturally, as a material therefor, other soft magnetic film such as FeNi, CoNiFe or the like may be used.

Figure 8E:
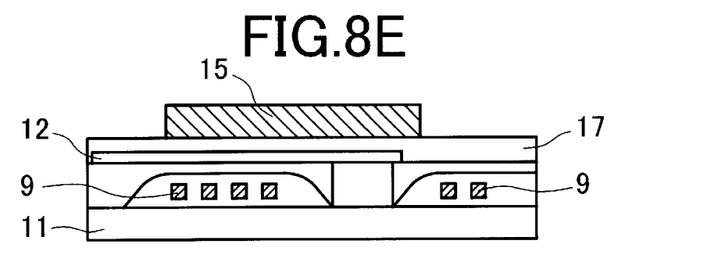

FIG. 8E shows that the resist frame has been removed, the shield 15 against the external magnetic field has been formed and the perpendicular recording head has been finished. Although in this case, there is used the electroplating method with photoresist frame, there may be used a method of forming a pattern by ion milling after depositing the magnetic film by sputtering.

By mounting the perpendicular recording magnetic recording head, there can be fabricated a magnetic disk drive of a perpendicular recording type without erasure of noise by the external magnetic field and magnetization signal and having high stability.

There are pointed out representative constitution examples as follows.

(1) A magnetic disk drive constituted to execute recording and reproducing by a thin film magnetic recording head onto and from a magnetic disk, wherein the thin film magnetic recording head includes a single pole type perpendicular type recording head which includes an auxiliary magnetic pole, a main pole and a shield against the external magnetic field and in which an edge of the shield against the external magnetic field is provided at a position recessed at least from an edge of the main pole relative to a surface against a medium.

(2) The magnetic disk drive in the constitution of (1) further including a reproducing head using a magnetoresistance effect for reproduction.

(3) The magnetic disk drive in the constitution of (1), wherein an amount of recession of the shield against the external magnetic field from the surface against the medium falls in a range of 0.5 through 3 μm at a portion thereof opposed to the main pole.

According to the invention, there are realized the thin film magnetic head having the perpendicular recording head in which by providing the shield against the external magnetic field recessed from the surface against the medium, noise by the external magnetic field is eliminated and the shield for preventing the noise does not leak the magnetic field to the medium and the method of fabricating the thin film magnetic recording head, further, there is provided the magnetic disk drive mounted therewith having high stability.

What is claimed is:

1. A thin film magnetic recording head comprising a single pole type perpendicular recording head including an auxiliary pole, a main pole and a shield against an external magnetic field, wherein an edge of the shield against the external magnetic field which faces a recording medium is provided at a position recessed at least from a plane of an air bearing surface of the magnetic recording head at which an edge of the main pole which faces the recording medium is arranged with respect to a surface of the recording medium.

2. The thin film magnetic recording head according to claim 1, further comprising a reproducing head using a magnetoresistance effect for reproduction.

3. The thin film magnetic recording head according to claim 1, wherein an amount of recession of the edge of the shield against the external magnetic field from the plane of the air bearing surface falls in a range of 0.5 through 3 μm.

4. The thin film magnetic head according to the claim 1, wherein an interval of a gap formed between the main pole and the shield against the external magnetic field falls in a range of 0.5 through 3 μm.

5. The thin film magnetic head according to the claim 1, wherein a position of an opposite edge of the shield against the external magnetic field in a direction remote from the plane of the air bearing surface, is disposed to be remote from a position of an opposite edge of the main pole in the direction remote from the plane of the air bearing surface by a distance of 1 to 10 μm.

6. The thin film magnetic head according to claim 1, wherein an opposite edge of the shield against the external magnetic field in a direction remote from the plane of the air bearing surface extends beyond an opposite edge of the main pole in the direction remote from the plane of the air bearing surface by a distance of 1 to 10 μm.

7. A thin film magnetic recording head including a reproducing head using a magnetoresistance effect and a single pole type perpendicular recording head, wherein the perpendicular recording head includes an auxiliary pole, a main pole, a shield against an external magnetic field, a first gap layer formed between the auxiliary pole and the main pole and a second gap layer formed between the main pole and the shield against the external magnetic field, and wherein a width of the auxiliary pole opposed to the first gap layer is larger than a width of the main pole opposed to the first gap layers and an edge of the shield against the external magnetic field which faces a recording medium is provided at a position recessed at least from a plane of an air bearing surface of the magnetic recording head at which an edge of the main pole which faces the recording medium is arranged with respect to a surface of the recording medium.

* * * * *